United States Patent [19]
Wiley

[11] 3,802,104
[45] Apr. 9, 1974

[54] SPHERICAL BALL PICTURE VIEWING DEVICE

[76] Inventor: Rosemary C. Wiley, 1311 Raintree Cir., Culver City, Calif. 90230

[22] Filed: Sept. 21, 1971

[21] Appl. No.: 182,431

[52] U.S. Cl. .................................................. 40/152
[51] Int. Cl. .............................................. G09f 1/12
[58] Field of Search .... 40/10 D, 63 A, 64 A, 106.1, 40/327, 152; 161/16, 18; 350/179

[56] References Cited
UNITED STATES PATENTS

| | | | |
|---|---|---|---|
| 1,378,011 | 5/1921 | Cregier | 350/276 SL |
| 2,340,421 | 2/1944 | Obrist | 40/16.4 |
| 2,521,558 | 9/1950 | Alvarez | 40/152 |
| 3,440,128 | 8/1969 | Kubilius | 161/16 X |
| 3,624,939 | 12/1971 | Gossard | 40/152 X |

FOREIGN PATENTS OR APPLICATIONS

| | | | |
|---|---|---|---|
| 565,465 | 3/1958 | Belgium | 40/10 D |
| 501,837 | 6/1937 | Great Britain | 40/327 |

Primary Examiner—Robert W. Michell
Assistant Examiner—Wenceslao J. Contreras
Attorney, Agent, or Firm—Robert E. Kleve

[57] ABSTRACT

The invention comprises a plurality of spherical transparent balls each having a flattened face portion along one side thereof. A picture is embedded into the one side face portion of each ball. The face of the picture has pictorial matter thereon directed toward the center axis of the transparent ball, so that the picture will be magnified when viewed from the face of the ball opposite the flattened face portion. A wire is embedded into each ball, and the wire of the balls are connected together to form a grape like cluster.

1 Claim, 4 Drawing Figures

PATENTED APR 9 1974  3,802,104

INVENTOR
ROSEMARY C. WILEY
BY Robert E. Kleve
ATTORNEY

SPHERICAL BALL PICTURE VIEWING DEVICE

This invention relates to pictorial displays.

It is an object of the invention to provide a novel cluster of transparent balls each having a picture embedded in one face of the ball with the pictorial face of the picture directed toward the center axis of the ball so that the pictorial face of the picture will be magnified when viewed from the face of the ball opposite the picture.

It is another object of the invention to provide a novel cluster of spherical balls each magnifying a picture in an attractive manner.

It is another object of the invention to provide a cluster of transparent balls each having a picture mounted thereon with the ball magnifying the picture in a manner coinciding with the magnification characteristics of a spherical ball.

Further objects and advantages of the invention will become apparent as the description proceeds and when taken in conjunction with the accompanying drawing wherein.

Briefly stated, the invention comprises a spherical transparent ball having a flattened face portion, a picture is embedded into said flattened face of the ball, the face of the picture having pictorial matter thereon is directed toward the center axis of the ball, so that the picture may be viewed from the spherical face of the ball opposite the flattened face, with the picture magnified in a manner coinciding with the spherical characteristics of the transparent ball.

Figure 1:
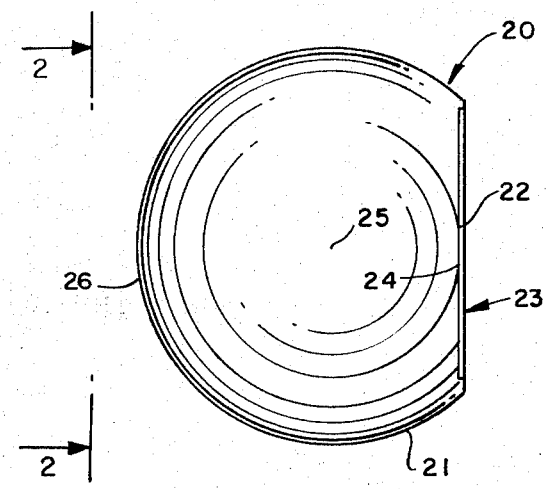
FIG. 1 is a side elevational view of the spherical ball picture magnifying device.
Figure 2:
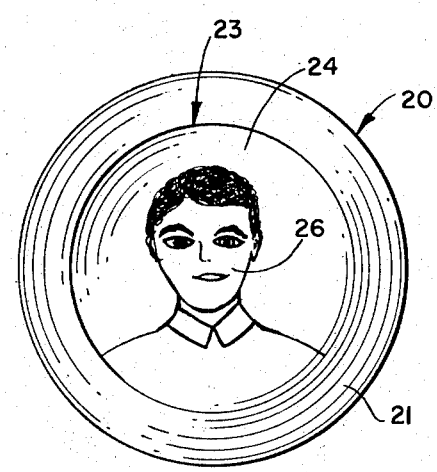
FIG. 2 is a front elevational view of the spherical ball picture magnifying device.
Figure 3:
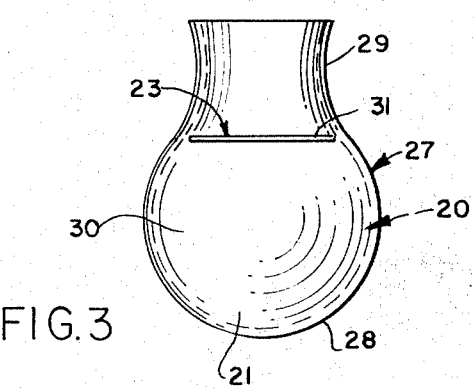
FIG. 3 is a side elevational view of the apparatus for manufacturing the spherical ball picture magnifying device.
Figure 4:
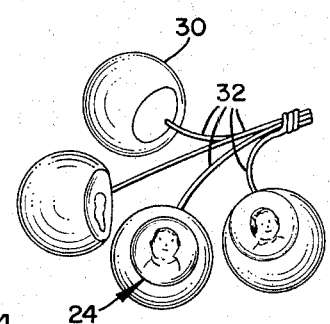
FIG. 4 is a perspective view of the spherical balls connected together to form a grape like cluster.

Referring more particularly to the drawings, in FIG. 1 and 2, the spherical ball picture magnifying device 20 is illustrated. The magnifying device has a transparent spherical ball member 21 which is formed from transparent plastic material. The transparent ball member 21 has a flattened face portion 22 along one side thereof. A picture 23 is embedded into the flattened face portion 22. The picture 23 has pictorial matter along its inner face 24, which inner face 24 is directed toward the center axis 25 of the transparent ball 21.

A viewer when viewing the picture 23 will view the pictorial matter 24, from the spherically curved face portion 26 of the ball, diametrically opposite the flattened face portion 24, such as generally illustrated in FIG. 2. The magnification characteristic of the spherical transparent ball produces and provides a distinctive novel magnified view of the pictorial matter to the viewer.

MANUFACTURE OF THE TRANSPARENT BALL PICTURE MAGNIFYING DEVICE

The transparent ball picture magnifying device 20 is manufactured by means of a fracturable spherical glass or plastic recepticle 27. The recepticle 27 has a spherical hollow lower portion 28 and a rounded outwardly flaring mouth portion 29. The device 20 will be manufactured by pouring the transparent plastic material or resin material 30 into the recepticle 27 while the plastic material is in its liquid form, into the recepticle 27 until it reaches the level 31 in the recepticle. The picture 23 will then be folded or bent partially to enable it to be slipped into the mouth of the recepticle, and it will then be straightened or flattened against the liquid plastic 30, at the level 31, and immersed slightly to securely embed the picture in the plastic material.

Once the picture 23 has been positioned, a hardener will be added to the plastic material 30. When the plastic material 30 has hardened into the transparent ball 21, the recepticle will be fractured or broken apart and the transparent ball removed, with the picture 23 embedded and fixed in the transparent ball.

Thus it will be seen that a novel picture magnifying device has been provided, whereby a spherical magnification of the picture is provided.

It is desirable that the picture be of reduced size with respect to the diameter of the transparent ball, and be relatively far away from the center axis of the ball for proper magnification of the picture.

Various colored dyes may be added to the plastic material 30, to provide a coloring to the spherical ball.

While it has been common in the past to make transparent balls out of plastic with wire attached into the ball to produce a grape like construction, a metal wire 32 may be attached to the picture ball invention by having one end 32' of the wire immersed in the plastic ball 30 of the invention behind the picture 23. The picture 23 is immersed sufficiently into the ball 30 so that the back side 23'' is covered with a layer of the plastic material for the end 32' of the wire to be immersed into. The end 32' may be formed into a loop 32'' which loop will extend perpendicular to the length of the wire and which loop will be flush against the back side 23'' of the picture and immersed in the layer of plastic behind the picture.

When the wire 32 is added to the spherical ball 30, a cluster of spherical balls may be made with wires of spherical ball connected together to form a cluster.

It will be obvious that various changes and departures may be made to the invention without departing from the spirit thereof, and accordingly it is not intended that the invention be limited to that specifically described in the specification or as illustrated in the drawing, but only as set forth in the appended claims wherein:

What is claimed is:

1. A transparent ball picture device comprising a cluster of transparent plastic spherical balls, each of said spherical balls having a minor portion flattened, a picture having pictorial matter along its inside face, said picture being immersed slightly into said ball in flush relationship into said flattened portion of said ball, said picture having its inside face spaced from and directed toward the center of the ball, whereby a viewer may view the picture from the curved spherical face of the ball diametrically opposite the flattened face of the ball to provide a magnication of the picture in the ball, a wire having one end imbedded into the flattened portion of the ball along the outside face of the picture, whereby said wires may be wrapped together to give the appearance of a cluster of grape like balls.

* * * * *